United States Patent [19]

Davies

[11] Patent Number: 5,718,734
[45] Date of Patent: Feb. 17, 1998

[54] OIL ADDITIVES AND COMPOSITIONS

[75] Inventor: Brian William Davies, Blewbury, United Kingdom

[73] Assignee: Exxon Chemical Patents Inc., Linden, N.J.

[21] Appl. No.: 697,772

[22] Filed: Aug. 30, 1996

Related U.S. Application Data

[63] Continuation of Ser. No. 360,664, filed as PCT/EP93/01664, Jun. 29, 1993, published as WO94/00536, Jan. 6, 1994, abandoned.

[30] Foreign Application Priority Data

Jun. 30, 1992 [GB] United Kingdom ............... 9213827

[51] Int. Cl.$^6$ .................... C10L 1/18; C10L 1/22
[52] U.S. Cl. ................... 44/393; 44/394
[58] Field of Search .................... 44/393, 394

[56] References Cited

U.S. PATENT DOCUMENTS

| | | | |
|---|---|---|---|
| 3,402,223 | 9/1968 | Hollingsworth | 260/897 |
| 3,642,459 | 2/1972 | Ilnyckyj | 44/393 |
| 3,961,916 | 6/1976 | Ilnyckyj et al. | 44/393 |
| 4,211,534 | 7/1980 | Feldman | 44/393 |
| 4,404,000 | 9/1983 | Toyoshima et al. | 44/393 |
| 4,661,121 | 4/1987 | Lewtas | 44/393 |

*Primary Examiner*—Margaret Medley
*Attorney, Agent, or Firm*—John J. Mahon

[57] ABSTRACT

Compositions comprising (a) an ethylene-mixed unsaturated ester copolymer or (b) two or more ethylene-unsaturated ester copolymers differing in their ester chains improve the low temperature properties of fuel oils.

15 Claims, No Drawings

OIL ADDITIVES AND COMPOSITIONS

This is a continuation of application Ser. No. 360,664, now abandoned, filed Dec. 21, 1994 which is based on PCT/EP93/01664 filed Jun. 29, 1993, filed as PCT/EP93/01664, Jun. 29, 1993, published as WO94/00536, Jan. 6, 1994, (GB 9213827.0 filed Jun. 30, 1992).

This invention relates to oil compositions, primarily to fuel oil compositions, and more especially to fuel oil compositions susceptible to wax formation at low temperatures, and to additive compositions for such fuel oil compositions.

Heating oils and other distillate petroleum fuels, for example, diesel fuels, contain alkanes that at low temperature tend to precipitate as large crystals of wax in such a way as to form a gel structure which causes the fuel to lose its ability to flow. The lowest temperature at which the fuel will still flow is known as the pour point.

As the temperature of the fuel falls and approaches the pour point, difficulties arise in transporting the fuel through lines and pumps. Further, the wax crystals tend to plug fuel lines, screens, and filters at temperatures above the pour point. These problems are well recognized in the art, and various additives have been proposed, many of which are in commercial use, for depressing the pour point of fuel oils. Similarly, other additives have been proposed and are in commercial use for reducing the size and changing the shape of the wax crystals that do form. Smaller size crystals are desirable since they are less likely to clog a filter; certain additives inhibit the wax from crystallizing as platelets and cause it to adopt an acicular habit, the resulting needles being more likely to pass through a filter than are platelets. The additives may also have the effect of retaining in suspension in the fuel the crystals that have formed, the resulting reduced settling also assisting in prevention of blockages.

Effective wax crystal modification (as measured by CFPP and other operability tests, as well as simulated and field performance) may be achieved by ethylene-vinyl acetate or propionate copolymer (EVAC or EVPC)-based flow improvers.

In EP-A-45342 is described a cold flow additive, based on an EVAC modified by esterification with 2-ethylhexanoic, acrylic, and phthalic acids.

In "Wissenschaft und Technik" 42(6), 238 (1989), M. Ratsch & M. Gebauer describe cold flow additives including an EVAC esterified with, inter alia, n-hexanoic acid.

In U.S. Pat. No. 3,961,916, middle distillate flow improvers are described which comprise a wax growth arrestor and a nucleating agent, the former being preferably a lower molecular weight ethylene-vinyl ester copolymer with a higher ester content, the latter preferably a higher molecular weight copolymer with a lower ester content, the esters preferably, but not necessarily, both being vinyl acetate.

In DE-AS-2407158, middle distillate flow improvers are described, comprising a mixture of low molecular weight ethylene-vinyl ester and ethylene-acrylic acid ester copolymers, both containing at least 40 mole per cent of the ester component.

The present invention is concerned to provide an oil, especially a fuel oil, additive effective to improve low temperature flow of the oil, and is based on the observation that a composition comprising at least two different copolymers of ethylene with an unsaturated ester, or a composition comprising a copolymer of ethylene with at least two different types of unsaturated ester-derivable units, is an effective cold flow improver having advantages over previously proposed compositions.

In a first aspect, the present invention provides a composition comprising
(a) an oil soluble ethylene copolymer having, in addition to units derived from ethylene, units of the formula

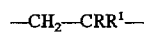     I and units of the formula

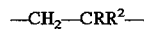     II the total proportion of units of the formulae I and II in the copolymer being within the range of from 7.5 to 35 molar percent, wherein each R independently represents H or $CH_3$, and each $R^1$ and $R^2$ independently represents a group of the formula $OOCR^3$, wherein each $R^3$ independently represents a hydrocarbyl group, provided that the units of the formula I are different from the units of the formula II and, if formula I represents —$CH_2$—$CH(OOCCH_3)$— the molar proportion of units I is at least 5%, or
(b) comprising
(i) an oil-soluble ethylene copolymer having, in addition to units derived from ethylene, from 7.5 to 35 molar per cent of units of the formula

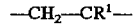     I and (ii) an oil-soluble ethylene copolymer having, in addition to units derived from ethylene, from 7.5 to 35 molar per cent of units of the formula

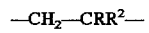     II wherein each R independently represents H or $CH_3$, and each $R^1$ and $R^2$ independently represents a group of the formula $COOR^3$ or $OOCR^3$, wherein each $R^3$ independently represents a hydrocarbyl group, provided that copolymer (i) differs from copolymer (ii), and that formulae I and II do not both represent —$CH_2$—$CH(OOCCH_3)$—.

As used in this specification the term "hydrocarbyl" refers to a group having a carbon atom directly attached to the rest of the molecule and having a hydrocarbon or predominantly hydrocarbon character. Among these, there may be mentioned hydrocarbon groups, including aliphatic, (e.g., alkyl or alkenyl), alicyclic (e.g., cycloalkyl or cycloalkenyl), aromatic, aliphatic and alicyclic-substituted aromatic, and aromatic-substituted aliphatic and alicyclic groups. Aliphatic groups are advantageously saturated. These groups may contain non-hydrocarbon substituents provided their presence does not alter the predominantly hydrocarbon character of the group. Examples include keto, halo, hydroxy, nitro, cyano, alkoxy and acyl. If the hydrocarbyl group is substituted, a single (mono) substituent is preferred. Examples of substituted hydrocarbyl groups include 2-hydroxyethyl, 3-hydroxypropyl, 4-hydroxybutyl, 2-ketopropyl, ethoxyethyl, and propoxypropyl. The groups may also or alternatively contain atoms other than carbon in a chain or ring otherwise composed of carbon atoms. Suitable hetero atoms include, for example, nitrogen, sulfur, and, preferably, oxygen. Advantageously, the hydrocarbyl group contains at most 30, preferably at most 15, more preferably at most 10 and most preferably at most 8, carbon atoms.

Advantageously, R represents H.

Advantageously $R^3$ represents an alkenyl or as indicated above, preferably, an alkyl group, which is advantageously linear. If the alkyl or alkenyl group is branched, for example, as in the 2-ethylhexyl group, the α-carbon atom is advantageously part of a methylene group. Advantageously, the alkyl or alkenyl group contains up to 30 carbon atoms, preferably from 1 (2 in the case of alkenyl) to 14 carbon atoms, and more preferably from 4 to 10 carbon atoms. As examples of alkyl or alkenyl groups there may be mentioned propyl, n-butyl, iso-butyl, and isomers, preferably the linear isomers, of pentyl, hexyl, heptyl, octyl, nonyl, decyl, undecyl, dodecyl, tridecyl, tetradecyl, pentadecyl, hexadecyl, heptadecyl, octadecyl, nonadecyl and icosyl, and their corresponding alkenyl, advantageously alk-omega-enyl, radicals. When $R^1$ and/or $R^2$ are of the formula $OOCR^3$, $R^3$ most preferably represents pentyl, and as indicated above, is advantageously n-pentyl.

As cycloalkyl, alkaryl and aryl radicals, there may be mentioned, for example, cyclohexyl, benzyl and phenyl.

The copolymer or copolymers may also contain units of formulae other than those mentioned above, for example units of the formula $$-CH_2-CRR^4- \qquad III$$

where $R^4$ represents —OH, or of the formula $$-CCH_3(CH_2R^5)-CHR^6- \qquad IV$$

where $R^5$ and $R^6$ each independently represent hydrogen or an alkyl group with up to 4 carbon atoms, the units IV advantageously being derived from isobutylene, 2-methylbut-2-ene or 2-methylpent-2-ene.

Units of the formula I or II may be terminal units but are advantageously internal units. Advantageously, units of the formula $-CRR^1CH_2-$ and $-CRR^2-CH_2-$ represent from 10 to 25, preferably from 10 to 20, and most preferably from 11 to 16, mole per cent of the polymer.

The copolymer (a) and each of copolymers b(i) and (ii) advantageously have a number average molecular weight, as measured by gel permeation chromatography., of at most 14,000, advantageously at most 10,000, more advantageously in the range of 1,400 to 7,000, preferably 2,000 to 5,500 and most preferably about 4,000. The preferred number average molecular weight will depend to some extent on the number of carbon atoms in $R^3$, the higher that number the higher the preferred molecular weight within the range above. Advantageously, the number average molecular weights of the polymers b(i) and b(ii) differ by at most 2000, more especially by at most 1000.

Polymers in which $R^1$ or $R^2$ represents $OOCR^3$ are preferred and more preferably both $R^1$ and $R^2$ both represent $OOCR^3$.

It is within the scope of the invention to use both a polymer (a) and the mixture of polymers (b) in the same additive composition. It is also within the scope of the invention to employ a polymer (a) having more than two different units of types I and II, or mixtures of two or more polymers (a). When employing the mixture of polymers (b) , units I in polymer (b) i are advantageously different from units II in polymer (b)ii, but it is also within the scope of the invention to employ a mixture of copolymers in which units I and II are the same, provided that the polymers differ in at least one respect, for example, proportion of units I and II in the polymer, the molecular weight, or the molecular weight distribution, of the polymer, the linearity of the polymer, or the presence of other units in the polymer.

The invention also provides an oil containing the additive composition, and an additive concentrate comprising the additive composition in admixture with an oil or a solvent miscible with the oil. The invention further provides the use of the additive composition to improve the low temperature properties of an oil. The oil may be a crude oil, i.e. oil obtained directly from drilling and before refining, the compositions of this invention being suitable for use as flow improvers therein.

The oil may be a lubricating oil, which may be an animal, vegetable or mineral oil, such, for example, as petroleum oil fractions ranging from naphthas or spindle oil to SAE 30, 40 or 50 lubricating oil grades, castor oil, fish oils or oxidized mineral oil. Such an oil may contain additives depending on its intended use; examples are viscosity index improvers such as ethylene-propylene copolymers, succinic acid based dispersants, metal containing dispersant additives and zinc dialkyl-dithiophosphate antiwear additives. The compositions of this invention may be suitable for use in lubricating oils as flow improvers, pour point depressants or dewaxing aids.

The oil may be a fuel oil, especially a middle distillate fuel oil. Such distillate fuel oils generally boil within the range of from 110° C. to 500° C., e.g. 150° to 400° C. The fuel oil may comprise atmospheric distillate or vacuum distillate, or cracked gas oil or a blend in any proportion of straight run and thermally and/or catalytically cracked distillates. The most common petroleum distillate fuels are kerosene, jet fuels, diesel fuels, heating oils and heavy fuel oils. The heating oil may be a straight atmospheric distillate, or it may contain minor amounts, e.g. up to 35 wt %, of vacuum gas oil or cracked gas oils or of both. The above-mentioned low temperature flow problem is most usually encountered with diesel fuels and with heating oils. The invention is also applicable to vegetable-based fuel oils, for example rape seed oil.

The additive or additives should preferably be soluble in the oil to the extent of at least 1000 ppm by weight per weight of oil at ambient temperature. However, at least some of the additive may come out of solution near the cloud point of the oil and function to modify the wax crystals that form.

In the composition (b) according to the invention, polymer (i) is advantageously an ethylene-vinyl acetate or propionate copolymer. Advantageously, the linearity of the polymer as expressed by the number of methyl groups per 100 methylene units, as measured by proton NMR, is from 1 to 15.

The copolymers, especially the ethylene-vinyl acetate or propionate copolymer may be made by any of the methods known in the art, e.g., by solution polymerization with free radical initiation, or by high pressure polymerization, conveniently carried out in an autoclave or a tubular reactor.

Alternatively, the copolymer may be made by saponification and re-esterification of an ethylene-vinyl acetate or propionate, or an ethylene-methyl or ethyl (meth)acrylate, copolymer.

A further method of making the copolymer is by transesterification, provided that the entering acid or alcohol is less volatile than that being removed.

If desired all, or substantially all, existing ester groups may be hydrolysed and completely replaced by the desired chain substituents. Alternatively, a proportion only may be hydrolysed, so that the resulting polymer contains, for example, acetate side chains and chains of longer length.

Where a copolymer (a) is being made, a mixture of ester monomer (where the polymer is being made directly) or of acid or alcohol reactants (where re-esterification or transesterification is being effected) is used in appropriate proportions, taking any differences in reactivity of the materials into account.

In embodiment (a) of the invention, units I and units II are preferably present, subject to the proviso given above if unit I is $-CH_2-CH(OOCCH_3)-$, in a molar ratio in the range of 2:98 to 98:2, advantageously 5:95 to 95:5, more especially from 1:10 to 10:1. In embodiment (b) polymers containing units I and units II are advantageously present in a weight ratio of from 10:1 to 1:10, preferably from 3:1 to 1:3, and more preferably in a ratio of about 1:1. In embodiment (a), if Formula I represents —CH$_2$—CH(OOCCH$_3$)— the ratio of units I to units II is advantageously within the range of from 20:80 to 95:5, preferably 3:1 to 1:3, and more preferably in a ratio about 1:1.

The additive composition and the oil composition may contain other additives for improving low temperature and/ or other properties, many of which are in use in the art or known from the literature.

For example, the composition may also contain a further ethylene-vinyl ester copolymer. As mentioned above, with reference to U.S. Pat. No. 3,961,916, flow improver compositions may comprise a wax growth arrestor and a nucleating agent. Without wishing to be bound by any theory, the applicants believe that the additive compositions of the present invention act primarily as arrestors, and benefit from the addition of nucleators, e.g., an ethylene-vinyl ester, especially acetate, having a number average molecular weight in the range of 1200 to 20000, and a vinyl ester content of 0.3 to 12 molar per cent, advantageously an ester content lower, and preferably at least 2, more preferably at least 3, molar per cent lower, than that of any ester in the additive composition as defined above.

The additive composition may also comprise a comb polymer. Such polymers are discussed in "Comb-Like Polymers. Structure and Properties", N. A. Plat__ and. V. P. Shibaev, J. Poly. Sci. Macromolecular Revs., 8, p 117 to 253 (1974).

Advantageously, the comb polymer is a homopolymer having, or a copolymer at least 25 and preferably at least 40, more preferably at least 50, molar per cent of the units of which have, side chains containing at least 6, and preferably at least 10, atoms.

As examples of preferred comb polymers there may be mentioned those of the general formula

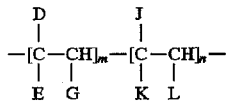

wherein D=R$^{11}$, COOR$^{11}$, OCOR$^{11}$, R$^{12}$COOR$^{11}$, or OR$^{11}$,
E=H, CH$_3$, D, or R$^{12}$,
G=H or D
J=H, R$^{12}$, R$^{12}$COOR$^{11}$, or an aryl or heterocyclic group,
K=H, COOR$^{12}$, OCOR$^{12}$, OR$^{12}$, or COOH,
L=H, R$^{12}$, COOR$^{12}$, OCOR$^{12}$, COOH, or aryl,
R$^{11}$≧C$_{10}$ hydrocarbyl,
R$^{12}$≧C$_1$ hydrocarbyl,
and m and n represent mole ratios, m being within the range of from 1.0 to 0.4, n being in the range of from 0 to 0.6. R$^{11}$ advantageously represents a hydrocarbyl group with from 10 to 30 carbon atoms, while R$^{12}$ advantageously represents a hydrocarbyl group with from 1 to 30 carbon atoms.

The comb polymer may contain units derived from other monomers if desired or required. It is within the scope of the invention to include two or more different comb copolymers.

These comb polymers may be copolymers of maleic anhydride or fumaric acid and another ethylenically unsaturated monomer, e.g., an α-olefin or an unsaturated ester, for example, vinyl acetate. It is preferred but not essential that equimolar amounts of the comonomers be used although molar proportions in the range of 2 to 1 and 1 to 2 are suitable. Examples of olefins that may be copolymerized with e.g., maleic anhydride, include 1-decene, 1-dodecene, 1-tetradecene, 1-hexadecene, and 1-octadecene.

The copolymer may be esterified by any suitable technique and although preferred it is not essential that the maleic anhydride or fumaric acid be at least 50% esterified. Examples of alcohols which may be used include n-decan-1-ol, n-dodecan-1-ol, n-tetradecan-1-ol, n-hexadecan-1-ol, and n-octadecan-1-ol. The alcohols may also include up to one methyl branch per chain, for example, 1-methylpentadecan-1-ol, 2-methyltridecan-1-ol. The alcohol may be a mixture of normal and single methyl branched alcohols. It is preferred to use pure alcohols rather than the commercially available alcohol mixtures but if mixtures are used the R$^{12}$ refers to the average number of carbon atoms in the alkyl group; if alcohols that contain a branch at the 1 or 2 positions are used R$^{12}$ refers to the straight chain backbone segment of the alcohol.

These comb polymers may especially be fumarate or itaconate, polymers and copolymers such for example as those described in European Patent Applications 153176, 153177, and 225688, and WO 91/16407.

Particularly preferred fumarate comb polymers are copolymers of alkyl fumarates and vinyl acetate, in which the alkyl groups have from 12 to 20 carbon atoms, more especially polymers in which the alkyl groups have 14 carbon atoms or in which the alkyl groups are a mixture of C$_{14}$/C$_{16}$ alkyl groups, made, for example, by solution copolymerizing an equimolar mixture of fumaric acid and vinyl acetate and reacting the resulting copolymer with the alcohol or mixture of alcohols, which are preferably straight chain alcohols. When the mixture is used it is advantageously a 1:1 by weight mixture of normal C$_{14}$ and C$_{16}$ alcohols. Furthermore, mixtures of the C$_{14}$ ester with the mixed C$_{14}$/C$_{16}$ ester may advantageously be used. In such mixtures, the ratio of C$_{14}$ to C$_{14}$/C$_{16}$ is advantageously in the range of from 1:1 to 4:1, preferably 2:1 to 7:2, and most preferably about 3:1, by weight.

Other suitable comb polymers are the polymers and copolymers of α-olefins and esterified copolymers of styrene and maleic anhydride, and esterified copolymers of styrene and fumaric acid; mixtures of two or more comb polymers may be used in accordance with the invention and, as indicated above, such use may be advantageous.

The additive composition may also comprise polar nitrogen compounds, for example those described in U.S. Pat. No. 4,211,534, especially an amide-amine salt of phthalic anhydride with two molar proportions of hydrogenated tallow amine, or the corresponding amide-amine salt of ortho-sulphobenzoic anhydride.

The additive composition of the invention may also comprise a copolymer of ethylene and at least one α-olefin, having a number average molecular weight of at least 30,000. Preferably the α-olefin has at most 20 carbon atoms. Examples of such olefins are propylene, 1-butene, isobutene, n-octene-1, is α-octene-1, n-decene-1, and n-dodecene-1. The copolymer may also comprise small amounts, e.g, up to 10% by weight of other copolymerizable monomers, for example olefins other than α-olefins, and non-conjugated dienes. The preferred copolymer is an ethylene-propylene copolymer. It is within the scope of the invention to include two or more different ethylene-α-olefin copolymers of this type.

The number average molecular weight of the ethylene-α-olefin copolymer is, as indicated above, at least 30,000, as measured by gel permeation chromatography (GPC) relative to polystyrene standards, advantageously at least 60,000 and preferably at least 80,000. Functionally no upper limit arises but difficulties of mixing result from increased viscosity at molecular weights above about 150,000, and preferred molecular weight ranges are from 60,000 and 80,000 to 120,000.

Advantageously, the copolymer has a molar ethylene content between 50 and 85 per cent. More advantageously, the ethylene content is within the range of from 57 to 80%, and preferably it is in the range from 58 to 73%; more preferably from 62 to 71%, and most preferably 65 to 70%.

Preferred ethylene-α-olefin copolymers are ethylene-propylene copolymers with a molar ethylene content of from 62 to 71% and a number average molecular weight in the range 60,000 to 120,000, especially preferred copolymers are ethylene-propylene copolymers with an ethylene content of from 62 to 71% and a molecular weight from 80,000 to 100,000.

The copolymers may be prepared by any of the methods known in the art, for example using a Ziegler type catalyst. The polymers should be substantially amorphous, since highly crystalline polymers are relatively insoluble in fuel oil at low temperatures.

The additive composition may also comprise a further ethylene-α-olefin copolymer, advantageously with a number average molecular weight of at most 7500, advantageously from 1,000 to 6,000, and preferably from 2,000 to 5,000, as measured by vapour phase osmometry. Appropriate α-olefins are as given above, or styrene, with propylene again being preferred. Advantageously the ethylene content is from 60 to 77 molar per cent although for ethylene-propylene copolymers up to 86 molar per cent by weight ethylene may be employed with advantage.

The composition may also comprise poly(ethylene glycol) esters, advantageously of fatty acids containing from 18 to 22 carbon atoms in the chain, especially when the fuel being treated lacks higher alkanes that act as wax crystallization nucleators.

In addition, the additive composition and the fuel oil composition may contain additives for other purposes, e.g., for reducing particulate emission or inhibiting colour and sediment formation during storage.

The fuel oil composition of the invention advantageously contains the additive of the invention, i.e., components (a) and (b) above, in a total proportion of 0.0005% to 1%, advantageously 0.001 to 0.1%, and preferably 0.04 to 0.06% by weight, based on the weight of fuel.

The following Examples, in which all parts and percentages are by weight, and number average molecular weights are measured by gel permeation chromatography, unless otherwise indicated, illustrate the invention.

EXAMPLE A

10 Kg (3.33 mole) of an ethylene-vinyl acetate copolymer containing 35% by weight vinyl acetate, Mn 3,000, degree of branching $4CH_3/100$ $CH_2$, is charged into a flask equipped with a condenser and heated to 60° C. with stirring under a nitrogen blanket. 216 g (1 mole) of sodium methoxide in 1.5 l n-butanol is added cautiously to the polymer, and subsequently a further 4 l of n-butanol. The solution changes from clear to orange, and the temperature falls to 46° C. The mixture is then heated to 90° C., the colour turning to deep red, and maintained at that temperature with stirring for 2 hours.

The reaction mixture is then heated at 104° C., at a pressure of 370 mm Hg, to distil off approximately 4 l butyl acetate. The remaining viscous polymer is poured at 90° C. into an acidified (150 ml 36 wt % solution of HCl) solvent comprising 100 l water and 5 l acetone. The solution is stirred for 3 hours, and the solids allowed to settle overnight at pH 6. After draining, the polymer is filtered through a fine mesh cloth and dried at 70° C.

20 g of the resulting polymer (Mn 3300, 85% hydrolysed as determined by NMR) are dissolved in an anhydrous mixture of 100 ml toluene and 10 ml pyridine. 30 ml lauroyl chloride dissolved in 100 ml toluene is added dropwise and the reaction mixture stirred for 1 hour at room temperature. The resulting solids are filtered off and solvent removed under vacuum to yield a viscous polymer. Further drying at 120° C. in vacuo to remove volatiles gives 21 g of a polymer in which $R^1$ represents a group of the formula —$OOCR^3$, $R^3$ representing n-undecyl. Yield 21 g, Mn 5000.

EXAMPLE B

The second part of Example A was repeated, but esterifying 50 g of the saponified polymer with myristoyl chloride to give a polymer in which $R^1$ represents —$OOCR^3$, $R^3$ representing n-tridecyl. Yield 40 g, Mn 5000.

EXAMPLE C

The second part of Example A was repeated, but esterification was with hexanoyl chloride, yielding a polymer Mn 3700, in which in —$OOCR^3$ $R^3$ represents n-pentyl.

EXAMPLE D

The procedure of the first part of Example A was repeated, saponifying 100 g of an ethylene-vinyl acetate copolymer containing 29% by weight vinyl acetate, Mn 3,300, degree of branching $CH_{3/100}$ $CH_2$: 4, using 19.3 g sodium methoxide and 90 g R-butanol. Yield: 74 g; Mn 3000, 93% hydrolysis.

20 g of the resulting saponified polymer are dissolved in an anhydrous solvent comprising 150 ml toluene and 6 ml pyridine at room temperature. 10 ml hexanoyl chloride in 100 ml toluene are added dropwise and the reaction mixture stirred for 5 hours at room temperature. The product is dried as described in Example A, yielding 20 g of a similar polymer.

EXAMPLE E

The procedure of Example C was repeated, but the saponified product was re-esterified with n-heptanoyl chloride.

EXAMPLE F

The procedure of Example C was repeated, but the saponified product was re-esterified with n-octanoyl chloride.

EXAMPLE G

Into a 3 liter stirred autoclave were charged 636 g of cyclohexane, 148.5 g of vinyl butyrate, and sufficient ethylene to achieve a pressure of 97 bar (9.7 MPa) at 124° C. 18 g of t-butyl peroctoate were dissolved in 85 ml cyclohexane and metered in with a further 351 g of vinyl butyrate and ethylene to maintain the above pressure over 75 minutes. After a soak time of 10 minutes, the reactor vessel was flushed with xylene. After evaporation of solvent, 992 g of ethylene-vinyl butyrate copolymer were recovered, vinyl butyrate content 36%, Mn 2400.

EXAMPLE H 100 g of ethylene-vinyl acetate copolymer, 36% by weight vinyl acetate, Mn 3300, degree of branching CH$_3$:100 CH$_2$:4, were put into a flask fitted with a stirrer, thermocouple (connected to heat controller), nitrogen inlet and a condenser arranged for distillation, and heated to 60° C. 66.46 g (molar equivalent) of methyl octanoate and 2.268 sodium methoxide (0.1 molar equivalent, as catalyst) were added, and the mixture was heated to 80° C. After 15 minutes, the reaction mixture was heated to 120° C., and maintained at that temperature, a clear distillate collecting in the condenser flask. Samples of polymer were taken at intervals to follow the progress of transesterification by comparing the height of the IR peak at 1240 cm$^{-1}$ (acetate group) with that at 1170 cm$^{-1}$ (octanoate). After 3½ hours, 79% of acetate groups had been replaced, and 11 g of distillate recovered. The reaction was continued at 120° C. for a further 5 hours, after which time 92% of acetate groups had transesterified. After a further 4 hours at 120° C. with total distillate at 18.2 g, the product was recovered. Yield 122 g, transesterification 94%. Number average molecular weight 4250.

The following fuels were used in Tests described in the following examples:

| Fuel | 1 | 2 | 3 | 4 | 5 | 6 | 7 | 8 | 9 | 10 |
| --- | --- | --- | --- | --- | --- | --- | --- | --- | --- | --- |
| Cloud Point, °C. | −5 | −6 | −5 | −3 | −6 | −7 | −12 | −3 | −4 | +8 |
| S.G. | 0.838 | 0.847 | 0.842 | 0.842 | 0.845 | 0.834 | 0.850 | 0.846 | 0.830 | 0.866 |
| CFPP, °C. | −6 | −8 | −6 | −3 | −7 | −8 | −12 | −4 | −7 | +3 |
| IBP, °C. | 153 | 154 | 142 | 180 | 185 | 111 | 150 | 174 | 124 | 241 |
| FBP, °C. | 354 | 361 | 360 | 364 | 364 | 357 | 360 | 369 | 357 | 372 |
| 90–20° C. | 105 | 80 | 102 | 82 | 78 | 126 | 74 | 110 | 118 | 67 |
| FBP–90° C. | 24 | 31 | 32 | 26 | 35 | 31 | 36 | 26 | 31 | 19 |
| Wax Content, % at 10° C. below cloud point | 2.4 | 3.4 | 3.1 | 3.1 | 2.9 | 2.3 | 2.3 | 2.0 | 3.1 | 3.0 |

CFPP in the Table above is measured as described in "Journal of the Institute of Petroleum", 52 (1966), 173.

EXAMPLES 1 TO 4

In these and the following numbered examples, copolymers made as described in Examples A to H above were employed in additive compositions some of which also comprise an ethylene/vinyl acetate or propionate copolymer in admixture with one or more of the fuels identified above. The efficacy of mixtures of copolymers in reducing CFPP of the fuel concerned was compared with that of the individual copolymers alone. In each case, efficacy was measured on a weight for weight basis. The Table below shows the CFPP, and the CFPP of the same fuel with no additive, when the various additives were employed in the concentrations shown.

Additive (a): Ethylene/vinyl acetate copolymer, vinyl acetate 29%, Mn 2,500, branching (CH$_3$/100 CH$_2$)4.
Additive (b): Product of Example C.
Additive (a)+(b): Equal weights of (a) and (b).

| Ex. | Fuel | CFPP | Treat | CFPP, °C. with Additive | | |
| --- | --- | --- | --- | --- | --- | --- |
| No. | No. | °C. | Rate, PPM | (a) | (b) | (a) + (b) |
| 1 | 4 | −3 | 200 | −6 | −6 | −11 |
| 2 | 5 | −7 | 200 | −17 | −17 | −20 |
| 3 | 8 | −4 | 100 | −15 | −5 | −19 |
| 4 | 9 | −7 | 100 | −12 | −12 | −16 |

EXAMPLES 5 TO 8

In these Examples, the reduction in CFPP of various fuels was compared using as additives:

Additive (a): Ethylene/vinyl propionate copolymer, vinyl propionate content 38% by weight, Mn 5200 CH$_3$/100 CH$_2$: 4.7.
Additive(b): Product of Example C.
Additive (a)+(b): Equal weights of (a) and (b).

| Ex. | Fuel | CFPP | Treat | CFPP, °C. with Additive | | |
| --- | --- | --- | --- | --- | --- | --- |
| No. | No. | °C. | Rate, PPM | (a) | (b) | (a) + (b) |
| 5 | 1 | −6 | 300 | −15 | −14 | −18 |
| 6 | 3 | −6 | 100 | −15 | −7 | −17 |
| 7 | 4 | −3 | 200 | −11 | −6 | −14 |
| 8 | 9 | −7 | 100 | −14 | −12 | −16 |

EXAMPLES 9 TO 13

In these Examples, the saponified ethylene/vinyl acetate copolymer of Example A re-esterified by acids of different chain length was employed alone and in 1:1 admixture with the conventional copolymer used as component (a) in Examples 1 to 4. Fuel No. 10, CFPP +3, was used, and the treat rate was 500 ppm.

| Ex. | Chain Length | CFPP, °C. with Additive | | |
| --- | --- | --- | --- | --- |
| No. | including carbonyl C. | (a) | (b) | (a) + (b) |
| 9 | 6 | −12 | −10 | −18 |
| 10 | 7 | −12 | −6 | −15 |
| 11 | 8 | −12 | −7 | −18 |
| 12 | 12 | −12 | +2 | −14 |
| 13 | 14 | −12 | +2 | −15 |

EXAMPLES 14 TO 16

The procedure of Examples 9 to 13 was repeated on Fuel No. 8, CFPP −4° C., at a treat rate of 100 ppm.

| Ex. | Chain Length | CFPP, °C. with Additive | | |
| --- | --- | --- | --- | --- |
| No. | including carbonyl C. | (a) | (b) | (a) + (b) |
| 14 | 6 | −15 | −4 | −19 |
| 15 | 7 | −15 | −2 | −17 |
| 16 | 8 | −15 | −7 | −19 |

EXAMPLES 17 TO 21

In these Examples, the product of Example B was used alone and in 1:1 admixture with the conventional copolymer used as component (a) in Examples 1 to 4 in various fuels at various treat rates.

| Ex. No. | Fuel No. | CFPP °C. | Treat Rate, PPM | CFPP, °C. with Additive | | |
|---|---|---|---|---|---|---|
| | | | | (a) | (b) | (a) + (b) |
| 17 | 4 | −3 | 300 | −14 | −2 | −15 |
| 18 | 5 | −7 | 200 | −17 | −7 | −19 |
| 19 | 6 | −8 | 100 | −11 | −14 | −17 |
| 20 | 7 | −12 | 50 | −24 | −17 | −25 |
| 21 | 10 | +3 | 500 | −12 | +2 | −15 |

EXAMPLE 22

In this Example, an ethylene-vinyl butyrate copolymer, the product of Example G, was used alone and in 1:1 admixture with additive (a) used in Examples 1 to 4 in Fuel 10, CFPP +3° C., at a total treat rate of 500 ppm. The CFPP using additive (a) alone was −14° C., using the ethylene-vinyl butyrate copolymer alone it was −10° C., and the 1:1 mixture gave a CFPP of −16° C.

EXAMPLES 23 AND 24

The ethylene/vinyl propionate copolymer used in Example 5 as additive (a) was in these Examples used alone and in 1:1 admixture in Example 23 with an ethylene-vinyl acetate copolymer 29% vinyl acetate, Mn 3300 as component (a) and in Example 24 with the product as Example G as component (a).

| Ex. No. | Fuel No. | CFPP °C. | Treat Rate, PPM | CFPP, °C. with Additive | | |
|---|---|---|---|---|---|---|
| | | | | (a) | (b) | (a) + (b) |
| 23 | 3 | −6 | 100 | −14 | −15 | −18 |
| 24 | 7 | −12 | 50 | −20 | −19 | −25 |

EXAMPLE 25

The products of Example D (polymer (a)) and of Example C (polymer (b)) are added separately to three samples of a fuel, at a treat rate of 200 ppm and in equal proportions at a total treat rate of 200 ppm.

| Fuel No. | CFPP °C. | CFPP, °C. with Additive | | |
|---|---|---|---|---|
| | | (a) | (b) | (a) + (b) |
| 4 | −3 | −12 | −6 | −16 |

The results clearly show the improvement obtained when a mixture of two different polymers is used, even when the chain lengths of the ester are the same.

EXAMPLE 26

The ethylene-vinyl acetate copolymer used as polymer (a) in Example 1 was also used in this example as polymer (a), with the product of Example C as polymer (b), in a fuel at a treat rate, or the total treat rate, of 200 ppm.

| Fuel No. | CFPP °C. | CFPP, °C. with Additive | | |
|---|---|---|---|---|
| | | (a) | (b) | (a) + (b) |
| 4 | −3 | −6 | −6 | −11 |

EXAMPLES 27 TO 38

In these Examples, the following designations were used:

| Material | Designation |
|---|---|
| The product of Example C | C |
| The product of Example D | D |
| The copolymer used as component (a) in Example 1 | 1 |
| Mixture of 14% and 86% of EVA copolymers with 13.5% VA, Mn 5000, and 29% VA, Mn 3300 respectively | 2 |

Individual designated materials and blends thereof, in each blend in equal proportions, were used in a variety of fuels at various treat rates. The blends of designated materials gave a lower CFPP than either material alone.

| Example No. | Fuel No. | CFPP °C. | Treat Rate ppm | Combination a, b | CFPP with | | |
|---|---|---|---|---|---|---|---|
| | | | | | (a) | (b) | (a) + (b) |
| 27 | 1 | −6 | 200 | 2, D | −13 | −14 | −18 |
| 28 | | | | 2, C | −13 | −14 | −17 |
| 29 | | | | C, D | −14 | −14 | −17 |
| 30 | 2 | −8 | 400 | C, D | −19 | −12 | −20 |
| 31 | 3 | −6 | 100 | 1, D | −14 | −16 | −18 |
| 32 | | | | 2, C | −14 | −7 | −17 |
| 33 | 4 | −3 | 100 | 1, D | −6 | −12 | −14 |
| 34 | | | | 2, D | −7 | −12 | −17 |
| 35 | | | | 1, C | −6 | −6 | −11 |
| 36 | | | | 2, C | −7 | −6 | −12 |
| 37 | 7 | −12 | 50 | D, C | −15 | −16 | −23 |
| 38 | | | | 1, C | −24 | −16 | −29 |

EXAMPLES 39 TO 42

Products produced by the procedure described in Example H, in Examples 39 and 41, 70% transesterified (designated 70) and in Examples 40 and 42, 94% transesterified (designated 94), in each case with octanoate, were used. Each product was used alone and in equal proportions with EVA 1.

| Examples No. | Fuel No. | CFPP °C. | Treat Rate ppm | Combination a, b | CFPP with (a) | (b) | (a) + (b) |
|---|---|---|---|---|---|---|---|
| 39 | 7 | −12 | 50 | 1, 70 | −21 | −24 | −26 |
| 40 | 7 | −12 | 50 | 1, 94 | −21 | −21 | −25 |
| 41 | 9 | −7 | 100 | 1, 70 | −12 | −15 | −17 |
| 42 | 9 | −7 | 100 | 1, 94 | −12 | −11 | −15 |

I claim:
1. A fuel oil composition comprising a fuel oil and a wax growth arrestor additive composition, being an arrestor for said fuel oil, comprising:
(a) an oil soluble ethylene copolymer having, in addition to units derived from ethylene, units of the formula

$$-CH_2-CRR^1- \quad \quad I$$

and units of the formula $$-CH_2-CRR^2- \quad \quad II$$

the total proportion of units of the formulae I and II in the copolymer being within the range of from 7.5 to 35 molar percent, wherein each R independently represents H or $CH_3$, and each $R^1$ and $R^2$ independently represents a group of the formula $OOCR^3$, wherein each $R^3$ independently represents a hydrocarbyl group having at most 8 carbon atoms, provided that the units of the formula I are different from the units of the formula II and, if formula I represents $-CH_2-CH(OOCCH_3)-$, the molar proportion of units I is at least 5%, or
(b) comprising
(i) an oil-soluble wax growth arrestor ethylene copolymer being an arrestor for said fuel oil having, in addition to units derived from ethylene, from 7.5 to 35 molar per cent of units of the formula $$-CH_2-CRR^1- \quad \quad I$$

and (ii) an oil-soluble wax growth arrestor ethylene copolymer, being an arrestor for said fuel oil, having, in addition to units derived from ethylene, from 7.5 to 35 molar per cent of units of the formula $$-CH_2-CRR^2- \quad \quad II$$

wherein each R independently represents H or $CH_3$, and each $R^1$ and $R^2$ independently represents a group of the formula $COOR^3$ or $OOCR^3$, wherein each $R^3$ independently represents a hydrocarbyl group, provided that
(A) when each of $R^1$ and $R^2$ represents $OOCR^3$, copolymer (i) is an ethylene-vinyl acetate copolymer and/or a copolymer in which $R^3$ is a linear alkyl group having 2 to 7 carbon atoms, and, in copolymer (ii), $R^3$ represents a linear alkyl group having from 2 to 7 carbon atoms;
(B) units of formula I differ from units of formula II; and
(C) the number average molecular weights of components (i) and (ii) differ by not more than 2,000;

with the proviso that additive (a) or (b) has a number average molecular weight of 2,000 to 5,500 and comprises at least one polymer made by saponification and re-esterification or by transesterification of an ethylene-vinyl acetate or propionate or an ethylene-methyl or ethyl meth(acrylate) copolymer.

2. A composition as claimed in claim 1, wherein $R^3$ represents a linear alkyl group having at least four carbon atoms.

3. A composition as claimed in claim 1 or claim 2, wherein $R^1$ and $R^2$ each represents $-OOCR^3$.

4. A composition as claimed in any one of claims 1 to 3, wherein R represents H.

5. A composition as claimed in claim 1, wherein the polymer components (b)(i) and (ii) each contain from 10 to 25 mole per cent of units of the formula I or formula II.

6. A composition as claimed in claim 1 which also comprises a wax nucleator which is an ethylene-vinyl ester copolymer having an ester content of at least 2 molar per cent lower than that of polymer (a) or of the lower representative of polymers b(i) and (ii).

7. A composition as claimed in claim 1, which also comprises a comb polymer is of the general formula

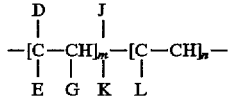

wherein D=$R^{11}$, $COOR^{11}$, $OCOR^{11}$, $R^{12}COOR^{11}$, or $OR^{11}$,
E=H, $CH_3$, D, or $R^{12}$,
G=H or D
J=H, $R^{12}$, $R^{12}COOR^{11}$, or an aryl or heterocyclic group,
K=H, $COOR^{12}$, $OCOR^{12}$, $OR^{12}$, or COOH,
L=H, $R^{12}$, $OCOR^{12}$, $OCOR^{12}$, COOH, or aryl,
$R^{11} \geq C_{10}$ hydrocarbyl,
$R^{12} \geq C_1$ hydrocarbyl,
and m and n represent mole ratios, m being within the range of from 1.0 to 0.4, n being in the range of from 0 to 0.6.

8. A composition as claimed in claim 7, wherein the comb polymer is a copolymer of vinyl acetate and a fumarate ester.

9. A composition as claimed in claim 8, wherein the ester groups are alkyl groups having from 12 to 20 carbon atoms.

10. A composition as claimed in claim 9, wherein the ester groups are derived from an alcohol having 14 carbon atoms, or a mixture of alcohols having 14 and 16 carbon atoms.

11. The composition as claimed in claim 1, wherein the comb polymer is (i) a Cu fumarate ester-vinyl acetate copolymer or
(ii) a $C_{14}/C_{16}$ fumarate ester-vinyl acetate copolymer.

12. A composition as claimed in claim 1, which contains the additive composition in a total proportion of from 0.005 to 1%, based on the weight of oil.

13. A composition as claimed in claim 12, which contains the additive in a total proportion of from 0.001 to 0.1%, based on the weight of oil.

14. A composition as claimed in claim 13, which contains the additive in a total proportion of from 0.004 to 0.06%, based on the weight of oil.

15. An additive concentrate comprising the additive composition of claim 1 in an oil or a solvent miscible with oil.

* * * * *